United States Patent
Harada et al.

(10) Patent No.: US 11,591,492 B1
(45) Date of Patent: Feb. 28, 2023

(54) SEMI-TRANSPARENT CLEAR FILE

(71) Applicant: Miyako Printing ink co.,ltd, Osaka (JP)

(72) Inventors: Kunio Harada, Osaka (JP); Mamoru Matsumoto, Osaka (JP)

(73) Assignee: MIYAKO PRINTING INK CO., LTD, Osaka (JP)

( * ) Notice: Subject to any disclaimer, the term of this patent is extended or adjusted under 35 U.S.C. 154(b) by 0 days.

(21) Appl. No.: 17/950,088

(22) Filed: Sep. 21, 2022

(30) Foreign Application Priority Data

Oct. 7, 2021 (JP) .............................. JP2021-165806

(51) Int. Cl.
| | | |
|---|---|---|
| *C09D 133/08* | (2006.01) | |
| *C08K 5/07* | (2006.01) | |
| *C08K 5/53* | (2006.01) | |
| *B32B 27/10* | (2006.01) | |
| *C08K 5/5313* | (2006.01) | |

(52) U.S. Cl.
CPC ............ *C09D 133/08* (2013.01); *B32B 27/10* (2013.01); *C08K 5/07* (2013.01); *C08K 5/5313* (2013.01)

(58) Field of Classification Search
CPC .......... C09D 133/08; C08K 5/07; C08K 5/53; B32B 27/10
USPC ....................................................... 428/34.2
See application file for complete search history.

(56) References Cited

U.S. PATENT DOCUMENTS

2020/0385929 A1\* 12/2020 Baumlin ................ D21H 19/20

FOREIGN PATENT DOCUMENTS

| CN | 107379814 A | \* | 11/2017 | .......... B42D 25/378 |
| CN | 207870573 U | \* | 9/2018 | |
| JP | 2015077716 A | \* | 4/2015 | |

\* cited by examiner

*Primary Examiner* — Michael M. Bernshteyn
(74) *Attorney, Agent, or Firm* — Lex IP Meister, PLLC

(57) ABSTRACT

[Problem] To contribute to SDGs by making it possible to provide a (semi-)transparent clear file with sufficient durability
[Means for Solving] A (semi-)transparent clear file of the present invention comprises (semi-)transparent covering paper P in which at least one surface of raw material paper R is covered with a cured product of a resin composition L. The resin composition L contains an energy ray polymerizable (meth)acrylic monomer and/or oligomer having a viscosity at 25° C. of 100 mPa·s or less, and glass transition temperature Tg of the cured product of 50° C. or higher. A basis weight of the paper is 65 g/m$^2$ or more and 100 g/cm$^2$ or less. The paper has a thickness of 80 μm or more and 100 μm or less. A proportion of the paper to 100 pts. mass of the covering paper P is 50 pts. mass or more, and a proportion of the cured product is less than 50 pts. mass. The monomer and/or the oligomer are/is preferably alkali-soluble, and also preferably contain/contains an inert resin. The raw material paper R is preferably uncoated paper.

4 Claims, 1 Drawing Sheet

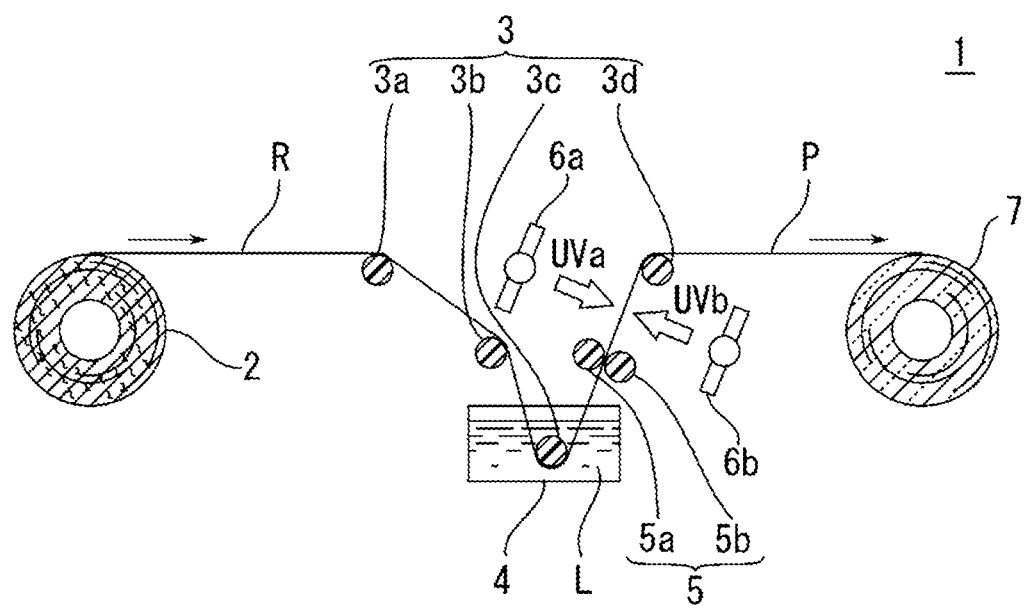

SEMI-TRANSPARENT CLEAR FILE

DETAILED DESCRIPTION OF THE INVENTION

Technical Field

The present invention relates to a (semi-)transparent clear file.

BACKGROUND ART

A clear file (also referred to as "clear folder"), which is a (semi-)transparent storage tool, is widely used as a storage tool for storing items to be stored, the items being exemplified by documents and/or slips of paper. Use of a clear file makes it possible to both store items to be stored together and to perceive at least some of the stored items from outside of the storage tool.

A clear file is entirely made of (semi-)transparent plastic. However, careless disposal of plastics by littering or the like not only impairs scenery, but also affects the environment or ecosystems, such as living creatures dying from mistakenly swallowing plastics, or the like. Hence, as sustainable development goals (Sustainable Development Goals, SDGs), it is advocated to realize new industrial promotion and economic growth while overcoming environmental problems caused by heavy use of fossil fuels.

For example, if a plastic clear file can be switched to a paper-made clear file, it may allow for contribution to SDGs by reduction of fossil fuel consumption and plastic waste. Although it is a technology to allow for visual confirmation of an address on an envelope, causing a resin composition to permeate absorbent paper and then curing the resin composition with active energy rays is proposed as a technology to make paper transparent. (Patent Literature 1). The resin compositions described in Patent Literature 1 include a polyfunctional acrylic modified oligomer (A), a polyfunctional acrylic monomer (B) other than (A), and a photopolymerization initiator (C), and the compositions have a viscosity at 25° C. of higher than 500 mPa·s and 3,000 mPa·s or lower.

According to the invention described in Patent Literature 1, it is possible to apply a resin composition on an opaque envelope or the like, cure the resin composition with active energy rays such as ultraviolet rays or the like, and process a part or whole of paper so that the paper will be translucent and underlying printed matters or patterns can be seen through.

CITATION LIST

Patent Literature

Patent Literature 1 Japanese Unexamined Patent Application Publication No. 2018-9047

SUMMARY OF THE INVENTION

Problems to be Solved by the Invention

Incidentally, in the invention described in Patent Literature 1, if an address written on an enclosure enclosed in an envelope can be determined, required performance is sufficiently satisfied. At the time of filing of the present application, paper clear files made of paper are commercially available. However, the real situation is that the commercially available paper clear files made of paper do not ensure sufficient transparency to replace clear files made of plastics. Specifically, if contents are printed in relatively dark colors such as approximately grade 3 of color fastness using a grayscale for staining specified by JIS L 0801, a user can determine the contents printed on a stored item through the paper clear file. On the other hand, if the stored item is printed in relatively light colors such as approximately grade 4 or grade 5 of the color fastness, the user cannot determine the contents printed on the stored item contained in the paper clear file.

In addition, if characters or the like describing the stored item can be written on a surface of a clear file with a pencil, it not only enhances a function of the clear file, which makes it possible to perceive the stored item, but also provides excellent reusability of the clear file and contributes to SDGs, because the written content can be erased with a rubber eraser.

In addition, a clear file may be placed in a setting where a force is applied to bend the clear file, the setting being exemplified by an edge of a bookend which is lower than the clear file, inside of a bag, or the like. Additionally, the clear file may be used in a setting where stored items are repeatedly taken in and out. Therefore, it is preferable that a paper clear file to be obtained be durable enough to withstand bending and the stored items being taken in and out.

The present invention has been made in light of such circumstances. The objective of the present invention is to contribute to SDGs by making it possible to provide a (semi-)transparent clear file that has transparency comparable to the clear file made of plastics, a writing characteristic with a pencil on the surface of the clear file, and sufficient durability.

Means for Solving the Problems

As a result of intensive studies to solve the problems described above, the inventor, et. al have found that use of an energy ray polymerizable (meth)acrylic monomer and/or oligomer that has a low viscosity, high glass transition temperature of a cured product, and excellent bending strength makes it possible to achieve the above-mentioned objective, and have completed the present invention. Specifically, the present invention provides the following.

An invention according to a first characteristic provides a (semi-)transparent clear file comprising (semi-)transparent covering paper in which at least one surface of uncoated paper is covered with a cured product of a resin composition, wherein the resin composition contains an energy ray polymerizable (meth)acrylic monomer and/or oligomer having a viscosity at 25° C. of 100 mPa·s or less, and glass transition temperature Tg of the cured product of 50° C. or higher, the uncoated paper has a basis weight of 65 g/m$^2$ or more and 100 g/cm$^2$ or less, the uncoated paper has a thickness of 80 μm or more and 100 μm or less, a proportion of the paper to 100 pts. mass of the covering paper is 50 pts. mass or more, and a proportion of the cured product is less than 50 pts. mass.

With the invention according to the first characteristic, the paper clear file comprises the (semi-)transparent covering paper in which the at least one surface of the uncoated paper is covered with the cured product of the resin composition. Among paper, coated paper, represented by coat paper, has a coating agent applied to its surface in order to further enhance luster of the surface or a no-see-through feature. Thus, the coated paper is poorer in transparency, as compared to a case where the uncoated paper is covered with the cured product of the resin composition. In the invention according to the first characteristic, because the uncoated paper is covered with the cured product, the user can determine the contents printed on the stored item even in a case where the stored item printed in the relatively light colors such as the grade 4 or grade 5 of the color fastness using the grayscale for staining specified by JIS L 0801 is stored in the paper clear file.

Here, paper can be made transparent by impregnating the paper with a liquid. The liquid may be water or oil, but a refractive index of oil (for example, paraffin oil has the refractive index of 1.48) is closer to the refractive index of cellulose (1.47), which is a dominant component of paper, as compared to the refractive index of water (1.33). Thus, it is preferable that the liquid be oil. However, irrespective of whether the liquid is water or oil, evaporation of water over time may compromise the transparency of the impregnated paper. In addition, the evaporated liquid may contaminate the surroundings. Moreover, the surface of the paper in wet condition may cause the paper to lose its adhesiveness or writability.

With the invention according to the first characteristic, since the viscosity of the resin composition in an uncured state (25° C.) is 100 mPa·s or less, the paper can be easily impregnated with the resin composition. In addition, since the refractive index of the resin composition is close to the refractive index of oil, the refractive index of the resin composition is closer to the refractive index of cellulose than the refractive index of water. This contributes to improved transparency of the paper. In addition, since excess resin composition can be easily removed and the resin composition can be reused, a secondary effect of further contributing to achievement of SDGs is expected.

With the invention according to the first characteristic, since the glass transition temperature Tg of the cured product of the energy ray polymerizable (meth)acrylic monomer and/or oligomer contained in the resin composition is 50° C. or higher, the cured product may be prevented from undergoing glass transition and thus becoming soft in a normal temperature environment where the clear file is usually used. Therefore, a durable (semi-)transparent paper clear file may be provided.

In addition, since the energy ray polymerizable resin composition containing the (meth)acrylic monomer and/or oligomer cover/covers, as the cured product, the at least one surface of the uncoated paper, it is possible to prevent all of decreased transparency due to the evaporation of the liquid, and deterioration of the adhesiveness and the writability due to wetness of the paper surface.

For example, a sticker for advertising at the time of purchase (Point of purchase advertising, POP) being attached from the inner surface of the paper clear file, it is possible for a user of the paper clear file to perceive contents of the POP advertisement printed on the sticker, while maintaining smoothness of the surface of the paper clear file. This makes it easier to use the paper clear file as a novelty good in a business category exemplified by a hospital, a health insurance company, or the like, where efforts toward SDGs lead to promotion of a corporate image, and may be able to provide a new use as promotion items that could not be realized by the prior-art paper clear file with low transparency. Additionally, if it is easy to put an adhesive sticky note describing the stored item on the surface of a clear file, the function of the clear file that makes it possible to perceive the stored item may be further enhanced.

In addition, if characters or the like describing the stored item can be written on the surface of the clear file with a pencil, it not only enhances the function of the clear file that makes it possible to perceives the stored item, but also provides excellent reusability of the clear file and contributes to SDGs, because the written content can be erased with a rubber eraser.

In the meantime, a clear file may be placed in a setting where a force is applied to bend the clear file, the setting being exemplified by an edge of a bookend which is lower than the clear file, inside of a bag, or the like. Additionally, the clear file may be used in a setting where stored items are repeatedly taken in and out. Therefore, it is preferable that a paper clear file to be obtained be durable enough to withstand bending and the stored items being taken in and out.

With the invention according to the first characteristic, since the glass transition temperature Tg when the resin composition is cured is 50° C. or higher, the paper clear file has sufficient durability to withstand the bending and the stored items being taken in and out.

In addition, with the invention according to the first characteristic, the proportion of the paper to 100 pts. mass of the covering paper is 50 pts. mass or more, and the proportion of the cured item is less than 50 pts. mass. Thus, usage of paper, which is a biomass material, may be increased and usage of the resin compositions may be further reduced. This can contribute even more to SDGs.

Therefore, with the invention according to the first characteristic, it is possible to contribute to SDGs by making it possible to provide the (semi-)transparent clear file that has transparency comparable to the clear file made of plastics, a writing characteristic with a pencil on the surface of the clear file, and sufficient durability.

An invention according to a second characteristic is an invention according to the first characteristic and provides a (semi-)transparent clear file wherein the monomer and/or the oligomer are/is alkali-soluble.

With the invention according to the second characteristic, since the monomer and/or the oligomer are/is alkali-soluble, the monomer and/or the oligomer may be removed with the use of an alkaline solution. Consequently, it may be further expected that reuse of (semi-)transparent clear files, paper, and/or resin compositions will be facilitated, which may thus contribute even more to SDGs.

According to an invention according to a third characteristic is an invention according to the first or the second characteristic, and provides a (semi-)transparent clear file, wherein the resin composition contains 70 pts. mass or more and 90 pts. mass or less of a (meth)acrylic acid ester monomer with respect to 100 pts. mass of the resin composition, and 20 pts. mass or less of a (meth)acrylic acid ester oligomer and/or an inert resin with respect to 100 pts. mass of the resin composition.

With the invention according to the third characteristic, since the resin composition contains the (meth)acrylic acid ester monomer, a contraction in volume during a transition from the uncured state to a cured state can be suppressed. This can prevent the paper clear file from curling into a curved surface.

Moreover, since the resin composition contains the (meth)acrylic acid ester oligomer and/or the inert resin, it is possible to make the cured item sufficiently hard. As such, the paper clear file has the sufficient durability to withstand the bending and the stored items being taken in and out. In addition, sensitivity to a pencil or ink or the like used in writing may be enhanced, thus making it easier to write the characters or the like describing the stored item on the surface of the clear file. Therefore, the function of the clear file that makes it possible to perceive the stored item may be further enhanced.

Therefore, with the invention according to the third characteristic, it is possible to contribute to SDGs by making it possible to provide a (semi-)transparent clear file that has the transparency comparable to the clear file made of plastics, the writing characteristic with a pencil on the surface of the clear file, and the sufficient durability.

The invention according to a fourth characteristic is the invention according to any of the first characteristic to the third characteristic, and provides a (semi-)transparent clear file, wherein the resin composition contains an acylphosphine compound, alkylbenzophenone, and a hydroxyalkylphenone compound.

There are energy rays containing a plurality of wavelength components, for curing a resin composition permeated into a (semi-)transparent clear file by energy ray polymerization. Depending on the wavelength components, the energy rays may differ in a degree of absorption by the resin compositions near the surface.

Of the energy rays, a wavelength component, which is more absorbed by the resin compositions near the surface, is less likely to be absorbed near the surface and reach the inside, so that the resin compositions near the surface may be cured more than the internal resin compositions. In addition, of the energy rays, a wavelength component, which is less absorbed by the resin compositions near the surface, is more likely to reach the inside without being absorbed near the surface, and thus may cure even more internal resin compositions than the resin compositions near the surface.

Therefore, in a case where energy ray polymerization is performed using the energy rays containing a plurality of wavelength components, the resin composition includes a photopolymerization initiator that corresponds to each of these wavelength components, so that speed of curing in the interior and speed of curing in the vicinity of the surface may be balanced by controlling a balance between the curing speed of the resin compositions near the surface and the curing speed of the internal resin composition. This may prevent the (semi-)transparent clear file from deforming due to a difference in the curing speed.

The acylphosphine compound, alkylbenzophenone, and the hydroxyalkylpheone compound may act as the photopolymerization initiator. The acylphosphine compound has absorption wavelength peaks, for example, around a wavelength of 230 to 274 nm or the like and around a wavelength of 202 to 332 nm or the like. Alkylbenzophenone also has an absorption wavelength peak, for example, around a wavelength of 250 nm. Furthermore, the hydroxyalkylphenone compounds has absorption wavelength peaks, for example, around a wavelength of 237 to 275 nm or the like and around a wavelength around 380 nm or the like. Therefore, these photopolymerization initiators may have at least one absorption wavelength peak at mutually different wavelengths.

Therefore, with the invention according to the fourth characteristic, by containing the acylphosphine compound, alkylbenzophenone, and the hydroxyalkylphenone compound, which are the photopolymerization initiators corresponding to different wavelength components, the balance between the curing speed of the resin composition in the vicinity of the surface and the curing speed of the resin composition in the interior may be controlled, and the (semi-)transparent clear file may be prevented from deforming due to the difference in the curing speed. Moreover, coloring of the paper during the energy ray polymerization may be prevented, thus making the paper even more transparent, and further enhancing the function of the clear file that makes it possible to perceive the stored item.

With the invention according to the fourth characteristic, since the balance between the curing speed of the resin composition in the vicinity of the surface and the curing speed of the resin composition in the interior may be controlled, it may also be expected that increasing molecular weight of polymers polymerized by the energy ray will eliminate sticky feeling when touched.

Therefore, with the invention according to the fourth characteristic, it is possible to contribute to SDGs by making it possible to provide the (semi-)transparent clear file having the sufficient durability.

Effect of the Invention

According to the present invention, it is possible to contribute to SDGs by making it possible to provide a (semi-)transparent clear file that has transparency comparable to a clear file made of plastics, a writing characteristic with a pencil on the surface of the clear file, and sufficient durability.

BRIEF DESCRIPTION OF THE DRAWING

FIG. 1 is a schematic diagram schematically describing a covering process of the present embodiment.

MODE FOR CARRYING OUT THE INVENTION

In the following, a description is given of an example of a preferred mode for carrying out the present invention with reference to the FIGURE. It is to be noted that this is merely an example, and a technical scope of the present invention is not limited thereto.

<Method of Manufacturing a Clear File>

A method of manufacturing a (semi-)transparent clear file made of paper (hereinafter also simply referred to as a "clear file") in the present embodiment includes an impregnation process for impregnating raw material paper (hereinafter also simply referred to as "paper") with a resin composition; an irradiation process for irradiating with energy rays the paper impregnated with the resin composition obtained in the impregnation process to cure the impregnated resin composition; and an assembly process for assembling a clear file using (semi-)transparent covering paper (hereinafter simply referred to as "covering paper") obtained in the irradiation process.

[Impregnation Process]

The impregnation process is a process in which the raw material paper is impregnated with the resin composition.

Means for performing the impregnation process is not specifically limited, and may be, for example, means that uses a prior-art varnish coater or the like capable of applying a resin composition or the like to a surface of the paper.

Although it is not an essential aspect, it is preferable that the means for performing the impregnation process be means that uses a covering apparatus 1 to be described below. A detailed description is given of the covering apparatus 1 below with reference to FIG. 1.

[Raw Material Paper]

The raw material paper is not specifically limited as far as the raw material paper is uncoated paper (for example, paper used for packaging application) that is not coated with a coating agent (for example, a white pigment or the like). If the paper is coated paper, the covering paper may not become transparent due to the coating agent coated on the paper, which is not preferable.

Examples of the uncoated paper include single-glazed bleached kraft paper, pure white roll paper, high-quality paper, or the like. Among all, the uncoated paper is preferably single-glazed bleached kraft paper, pure white roll paper, or the like.

Single-glazed bleached kraft paper or pure white roll paper is paper that includes bleached pulp as a raw material, is finished smooth on only one side, and is widely used for envelopes, paper packs, and packaging application. Since the raw material is paper including bleached pulp, it may be expected that coloring of the covering paper by unbleached pulp will be prevented, and (semi-)transparent covering paper which is even more transparent will be obtained. In addition, since single-glazed bleached kraft paper or pure white roll paper is paper that is smooth-finished only on one side, it is possible to balance between suitably performing printing and writing or the like on the smooth-finished side and suitably causing the resin composition to penetrate on the other side.

A lower limit of a thickness of the raw material paper (also referred to as a "paper thickness") is preferably 60 μm or more, more preferably 70 μm or more, and even more preferably 80 μm or more. As such, (semi-)transparent covering paper with even higher durability may be obtained.

An upper limit of the thickness of the raw material paper is preferably 180 μm or less, preferably 130 μm or less, and even more preferably 100 μm or less. As such, it may be expected that the resin composition will further penetrate to inside, and that the (semi-)transparent covering paper which is even more transparent will be obtained.

The lower limit of a weight per square meter (also referred to as a "basis weight") is preferably 55 g or more, more preferably 60 g or more, and even more preferably 65 g or more. This makes it possible to prevent a clear file from bending when the raw material paper is made into the clear file. In addition, as a product, the clear file has the even higher durability.

The upper limit of the basis weight of the raw material paper is preferably 120 g or less, more preferably 105 g or less, and even more preferably 100 g or less. As such, it may be expected that the resin composition will further penetrate to the inside, and that the (semi-)transparent covering paper which is even more transparent will be obtained.

[Resin Composition]

The resin composition with which the paper is impregnated in the present embodiment is a resin composition containing an energy ray polymerizable (meth)acrylic monomer and/or oligomer that has a low viscosity, high glass transition temperature of the cured product and excellent bending strength (hereinafter also simply referred to as "energy ray polymerizable resin").

The viscosity of the resin composition in the uncured state (25° C.) is 100 mPa·s or less, preferably 40 mPa·s or less, and even more preferably 25 mPa·s or less. This makes it possible to easily impregnate the paper with the resin composition. In addition, since excess resin composition can be easily removed and the resin composition can be reused, a secondary effect of further contributing to achievement of SDGs is expected.

The viscosity of the resin composition in the uncured state (25° C.) is 1 mPa·s or more, preferably 5 mPa·s or more, and even more preferably 10 mPa·s or more. As such, excessive penetration of the energy ray polymerizable resin into the raw material paper may be prevented. In addition, the energy ray polymerizable resin may be prevented from volatilizing and becoming non-uniform.

It is preferable that a refractive index of the resin composition be close to the refractive index (1.47) of cellulose than to the refractive index (1.33) of water. This contributes to improved transparency of the paper.

It is preferable that the resin composition and various components contained in the resin composition have a half lethal dose LD50 exceeding 2000 mg/kg for acute toxicity in oral intake and dermal uptake. This may prevent a poisoning accident or the like in manufacturing processes.

It is preferable that the resin composition and various components contained in the resin composition have a primary irritation index (Primary Irritation Index, P11) of less than 2 for skin irritation. This may suppress an effect on the skin when the resin composition comes into contact with the skin in the manufacturing processes.

It is preferable that the resin composition and various components contained in the resin composition do not emit an irritating odor. This may prevent the health from being damaged by the irritating odor derived from the resin composition in the manufacturing processes.

[Energy Ray Polymerizable Resin]

The energy ray polymerizable resin is not specifically limited as far as the energy ray polymerizable resin is the energy ray polymerizable (meth)acrylic monomer and/or oligomer.

The lower limit of the glass transition temperature Tg of the cured product of the energy ray polymerizable resin is preferably 50° C. or higher, more preferably 80° C. or higher, and even more preferably 100° C. or higher.

By setting the lower limit of the glass transition temperature Tg of the energy ray polymerizable resin as described above, the cured product may be prevented from becoming soft due to a glass transition in a thermally neutral environment where clear files are usually used. Therefore, a durable (semi-)transparent paper clear file may be provided.

The energy ray polymerizable resin is preferably alkali-soluble. As such, the monomer and/or the oligomer may be removed with the use of an alkaline solution. Consequently, it may be further expected that reuse of (semi-)transparent clear files, paper, and/or resin compositions will be facilitated, which may thus contribute even more to SDGs.

It is preferable that the energy ray polymerizable resin have a volume contraction of 15% or less of the volume of the energy ray polymerizable resin in the uncured state, when the uncured state changes to the cured state. This can prevent the paper clear file from curling into a curved surface due to the volume contraction when the uncured state changes to the cured state.

The energy ray polymerizable resin preferably contains a (meth)acrylic monofunctional monomer. Examples of the meth(acrylic) monofunctional monomer include (meth)acryloyl morpholine, hydroxyethyl (meth)acrylamide, dimethyl (meth)acrylamide, isopropyl (meth)acrylamide, diethyl (meth)acrylamide, dimethylaminopropyl (meth)acrylamide, isobornyl (meth)acrylate, 3,3,5-trimethylcyclohexyl (meth)acrylate, or the like.

In addition, generally, since the energy ray polymerizable resin has higher reactivity to irradiated energy rays than the meth(acrylic) monofunctional monomer, the energy ray polymerizable resin preferably contains an acrylic monofunctional monomer, in particular.

In general, a monofunctional monomer exhibits less volume contraction upon curing than a polyfunctional monomer. If the volume contraction during curing is large, an amount of impregnated resin compositions and/or the curing speed or the like cause/causes differences in volume contraction in different parts of the paper, which may deform the paper. By the energy ray polymerizable resin containing the monofunctional monomer, the deformation of the paper during curing may be prevented.

Moreover, generally, the monofunctional monomer has a faster curing speed than the multifunctional monomer. By the energy ray polymerizable resin containing the monofunctional monomer, the resin composition may be cured in a shorter time to obtain covering paper.

In addition, generally, the monofunctional monomer has a lower viscosity than the multifunctional monomer. By the energy ray polymerizable resin containing the monofunctional monomer, the energy ray polymerizable resin may penetrate further into the raw material paper in the impregnation process to be described below.

In addition, if a resin composition containing an energy ray polymerizable resin with high viscosity is permeated into the paper, it may become difficult to remove the resin composition from the paper. When the resin composition for the (semi-)transparent clear file made of paper is reused, by the energy ray polymerizable resin containing the monofunctional monomer, the resin composition permeated into the paper may be removed more easily than the energy ray polymerizable resin with high viscosity. Consequently, it may be expected that the reuse of the paper and/or the resin composition will be facilitated. Therefore, this may contribute even more to achievement of SDGs.

Generally, the monofunctional monomer is more reactive to the irradiated energy rays than the multifunctional monomer. By the energy ray polymerizable resin containing the monofunctional monomer, the energy ray polymerizable resin is suitably polymerized in the irradiation process to be described below and may be cured in a further shorter time. As such, the (semi-)transparent covering paper may be obtained in a shorter time. In addition, it may be expected that productivity of clear files will increase.

Above all, the energy ray polymerizable resin preferably contains (meth)acryloyl morpholine. By the energy ray polymerizable resin containing (meth)acryloyl morpholine, it may be possible to balance among a low viscosity at 25° C. of 12 mPa·s or less, high glass transition temperature Tg of the cured product of 145° C. or higher, high bending strength in a cured product obtained by energy ray polymerization, and the volume contraction of less than 15% during curing.

The energy ray polymerizable resin preferably contains the (meth)acrylic acid ester monomer. By the energy ray polymerizable resin containing (meth)acrylic acid ester monomer, the volume contraction when the uncured state changes to the cured state is suppressed. This can prevent the paper clear file from curling into the curved surface.

The energy ray polymerizable resin may contain a (meth)acrylic multifunctional monomer. The (meth)acrylic multifunctional monomer may provide high durability because a polymer forms a three-dimensional crosslinked structure. Since the energy ray polymerizable resin contains the (meth)acrylic multifunctional monomer, the (semi-)transparent covering paper with even higher durability may be obtained.

Examples of the (meth)acrylic multifunctional monomer includes ethoxylated bisphenol A di(meth)acrylate, trimethylolpropane tri(meth)acrylate, or the like.

The energy ray polymerizable resin preferably contains a (meth)acrylic acid ester oligomer and/or an inert resin. This makes it possible to provide a cured product with sufficient hardness. As such, the paper clear file has the sufficient durability to withstand the bending and the stored items being taken in and out. In addition, the sensitivity to a pencil or ink or the like used in writing may be enhanced, thus making it easier to write the characters or the like describing the stored item on the surface of the clear file. Therefore, the function of the clear file that makes it possible to perceive the stored item may be further enhanced.

The (meth)acrylic acid ester oligomer includes urethane (meth)acrylate, for example.

Examples of the inert resin includes polyurethane resins, amino resins, phenol resins, polyamides, cellulose derivatives, fluorine resins, diallyl phthalate resins, vinyl resins, polyolefins, natural rubber derivatives, acrylic resins, epoxy resins, polyesters, polystyrene, alkyd resins, rosin-modified alkyd resins, linseed oil-modified alkyd resins, or the like.

The energy ray polymerizable resin preferably contains 70 pts. mass or more and 90 pts. mass of the (meth)acrylic acid ester monomer of with respect to 100 pts. mass of the resin composition, and 20 pts. mass or less of the (meth)acrylic acid ester oligomer and/or the inert resin with respect to 100 pts. mass of the resin composition. As such, the resin composition may balance among suppressing the volume contraction when the uncured state changes to the cured state, providing the cured product with sufficient hardness, and increasing the sensitivity to the pencil or the ink used in writing.

For the energy ray polymerizable resin to be alkali-soluble, it is preferable that the energy ray polymerizable resin contain a resin having an acid value, and have such an acid value that the energy ray polymerizable resin as a whole exhibits alkaline solubility. Resins having an acid value are exemplified by a monomer having an acid value or a styrene copolymer of the monomer and acrylic acid or maleic acid, or the like. This may increase a degree of solubility of the energy ray polymerizable resin in alkaline.

From a viewpoint of obtaining sufficient alkaline solubility, the acid value of the energy ray polymerizable resin is preferably 40 mgKOH/g or more, more preferably 100 mg/KOH/g or more, and even more preferably 150 mgKOH/g or more.

In the present embodiment, it is assumed that the acid value (unit: mgKOH/g) of the energy ray polymerizable resin is a value determined by neutralization titration. Specifically, the acid value of the energy ray polymerizable resin is determined by dissolving 1 g of the energy ray polymerizable resin in 20 mL of a mixed solvent of xylene and ethanol (xylene to ethanol=2 to 1 (mass ratio)), then, adding 3 mL of a 3 percent by mass phenolphthalein solution as an indicator, and neutralizing titrating with a 0.1 mol/L of ethanolic potassium hydroxide solution. Note that if it is difficult to extract the energy ray polymerizable resin as a single component from a target product when confirming whether or not it belongs to the technical scope of the present invention, the confirmation may be performed, by using an acid value to be determined by neutralizing titrating the resin composition covering the raw material paper as the acid value of the energy ray polymerizable resin.

The lower limit of the energy ray polymerizable resin with respect to 100 pts. mass of the resin composition is preferably 70 pts. mass or more, more preferably 73 pts. mass or more, and even more preferably 75 pts. mass or more. This may allow the covering paper to further obtain the durability and/or the transparency derived from the energy ray polymerizable resin.

The upper limit of the energy ray polymerizable resin with respect to 100 pts. mass of the resin composition is preferably 90 pts. mass or less, more preferably 88 pts. mass or less, and even more preferably 85 pts. mass or less. Thus, various components such as a photopolymerization initiator or the like may be added to the covering paper to impart various favorable properties exemplified by the reactivity to energy rays or the like.

(Photopolymerization Initiator)

The resin composition contains a photopolymerization initiator capable of initiating polymerization of the energy ray polymerizable resin by reacting with the energy rays. Since the resin composition contains the photopolymerization initiator, the photopolymerization initiator in the resin composition can react with the energy rays to initiate polymerization of the energy ray polymerizable resin.

The lower limit of the photopolymerization initiator with respect to 100 pts. mass of the resin composition 100 is preferably 5 pts. mass or more, more preferably 7 pts. mass or more, and even more preferably 8 pts. mass. As such, energy ray polymerization may be performed more reliably. Since the energy ray polymerization may be performed more reliably, it is possible to reduce adhesion of resin compositions, which are not energy ray polymerized, to apparatuses or the like used in processes of processing the (semi-)transparent covering paper (for example, a processing process, a folding process, and an adhesion process or the like, to be described below).

The upper limit of the photopolymerization initiator with respect to 100 pts. mass of the resin composition is preferably 15 pts. mass or less, more preferably 12 pts. mass or less, and even more preferably 10 pts. mass or less. This may prevent excessive photopolymerization initiators from making it difficult to control a reaction speed.

The photopolymerization initiator is not specifically limited as far as the photopolymerization initiator can initiate polymerization of the energy ray polymerizable resin by reacting with energy rays emitted in the irradiation process to be described below. Examples of the photopolymerization initiators include the acylphosphine compounds such as 2,4,6-trimethylbenzoyl-diphenylphosphine oxide, the hydroxyalkylphenone compounds such as 1-hydroxycyclohexyl-phenylketone, and/or the benzophenone compounds such as 4-methylbenzophenone, or the like.

Among them, the photopolymerization initiator is preferably a photopolymerization initiator containing the acylphosphine compounds, alkylbenzophenone, and the hydroxyalkylphenone compounds.

There are energy rays containing a plurality of wavelength components, for curing a resin composition permeated into a (semi-)transparent clear file by energy ray polymerization. Depending on the wavelength components, the energy rays may differ in a degree of absorption by the resin compositions near the surface.

Of the energy rays, a wavelength component, which is more absorbed by the resin compositions near the surface, is less likely to be absorbed near the surface and reach the inside, so that the resin compositions near the surface may be cured more than the internal resin compositions. In addition, of the energy rays, a wavelength component, which is less absorbed by the resin compositions near the surface, is more likely to reach the inside without being absorbed near the surface, and thus may cure even more internal resin compositions than the resin compositions near the surface.

Therefore, in a case where energy ray polymerization is performed using the energy rays containing a plurality of wavelength components, the resin composition includes a photopolymerization initiator that corresponds to each of these wavelength components, so that speed of curing in the interior and speed of curing in the vicinity of the surface may be balanced by controlling a balance between the curing speed of the resin compositions near the surface and the curing speed of the internal resin composition. This may prevent the (semi-)transparent clear file from deforming due to a difference in the curing speed.

The acylphosphine compound, alkylbenzophenone, and the hydroxyalkylpheone compound may act as the photopolymerization initiator. The acylphosphine compound has absorption wavelength peaks, for example, around a wavelength of 230 to 274 nm or the like and around a wavelength of 202 to 332 nm or the like. Alkylbenzophenone also has an absorption wavelength peak, for example, around a wavelength of 250 nm. Furthermore, the hydroxyalkylphenone compounds has absorption wavelength peaks, for example, around a wavelength of 237 to 275 nm or the like and around a wavelength around 380 nm or the like. Therefore, these photopolymerization initiators may have at least one absorption wavelength peak at mutually different wavelengths.

Therefore, since the photopolymerization initiator contains the acylphosphine compound, alkylbenzophenone, and the hydroxyalkylphenone compound, which are the photopolymerization initiators corresponding to different wavelength components, the balance between the curing speed of the resin composition in the vicinity of the surface and the curing speed of the resin composition in the interior may be controlled, and the (semi-)transparent clear file may be prevented from deforming due to the difference in the curing speed. Moreover, coloring of the paper during the energy ray polymerization may be prevented, thus making the paper even more transparent, and further enhancing the function of the clear file that makes it possible to perceive the stored item.

When the photopolymerization initiator contains the acylphosphine compound, alkylbenzophenone, and the hydroxyalkylphenone compound, a blending ratio thereof is not specifically limited.

The lower limit of the acylphosphine compound with respect to 100 pts. mass of the photopolymerization initiator contained in the resin composition is preferably 10 pts. mass or more, more preferably 20 pts. mass or more, and even more preferably 30 pts. mass or more. As such, the energy ray polymerization may be further performed at a location reached by the wavelength component corresponding to the absorption wavelength peak of the acylphosphine compound described above.

The upper limit of the acylphosphine compound with respect to 100 pts. mass of the photopolymerization initiator contained in the resin composition is preferably 80 pts. mass or less, more preferably 60 pts. mass or less, and even more preferably 50 pts. mass or less. As such, the energy ray polymerization may be prevented from being excessively performed at the location reached by the wavelength component corresponding to the absorption wavelength peak of the acylphosphine compound described above.

The lower limit of alkylbenzophenone with respect to 100 pts. mass of the photopolymerization initiator contained in the resin composition is preferably 10 pts. mass or more, more preferably 20 pts. mass or more, and even more preferably 25 pts. mass or more. As such, the energy ray polymerization may be further performed at a location reached by the wavelength component corresponding to the absorption wavelength peak of alkylbenzophenone described above.

The upper limit of alkylbenzophenone with respect to 100 pts. mass of the photopolymerization initiator contained in the resin composition is preferably 50 pts. mass or less, more preferably 40 pts. mass or less, and more preferably 35 pts.

mass or less. As such, the energy ray polymerization may be prevented from being excessively performed at the location reached by the wavelength component corresponding to the absorption wavelength peak of alkylbenzophenone described above.

The lower limit of the hydroxyalkylphenone compound with respect to 100 pts. mass of the photopolymerization initiator contained in the resin composition is preferably 10 pts. mass or more, more preferably 20 pts. mass or more, and even more preferably 25 pts. mass or more. As such, the energy ray polymerization may be further performed at a location reached by the wavelength component corresponding to the absorption wavelength peak of the hydroxyalkylphenone compound described above.

The upper limit of the hydroxyalkylphenone compound with respect to 100 pts. mass of the photopolymerization initiator contained in the resin composition is preferably 50 pts. mass or less, more preferably 40 pts. mass or less, and more preferably 35 pts. mass or less. As such, the energy ray polymerization may be prevented from being excessively performed at the location reached by the wavelength component corresponding to the absorption wavelength peak of the hydroxyalkylphenone compound described above.

Among others, the photopolymerization initiator is preferably a photopolymerization initiator containing a 2,4,6-trimethylbenzoyl-diphenylphosphine oxide, 4-methylbenzophenone, and 1-hydroxycyclohexyl-phenylketone.

The 2,4,6-trimethylbenzoyl-diphenylphosphine oxide has absorption wavelength peaks around a wavelength of 275 nm and around a wavelength of 379 nm. 4-methylbenzophenone has an absorption wavelength peak around a wavelength of 245 nm. 1-hydroxycyclohexyl-phenylketone has absorption wavelength peaks around a wavelength of 243 nm and around a wavelength of 331 nm.

Since the photopolymerization initiator contains the three kinds of compounds described above, the curing speed in the interior and curing speed in the vicinity of the surface may be balanced by emitting, for example, energy rays containing the wavelength components with wavelengths of 240 to 400 nm.

(Additives)

The resin composition may contain, as additives, an energy ray absorber, a polymerization inhibitor, a surface conditioner, a permeation accelerator, an antifoaming agent, an antibacterial agent, an antifungal agent, an antiviral agent, and/or a coloring agent (coloring material).

The upper limit of the additives with respect to 100 pts. mass of the resin composition is preferably 5 pts. mass or less, more preferably 4 pts. mass or less, and even more preferably 3 pts. mass or less. This may prevent excessive additives from reducing the curing speed and/or the transparency.

By the resin composition containing the energy ray absorber exemplified by an ultraviolet absorber (for example, a cyanoacrylate-based compound, a dihydroxybenzophenone-based compound, or the like) or the like, the energy ray polymerization may be further performed. In addition, deterioration of the resin composition due to the influence of the energy rays may be prevented.

By the resin composition containing the polymerization inhibitor exemplified by methylhydroquinone, a polymerization reaction may be prevented from starting before the irradiation process to be described below is performed.

By the resin composition containing the surface conditioner and/or the permeation accelerator exemplified by various kinds of surfactants or the like, the resin composition may further penetrate to the raw material paper.

By the resin composition containing the antifoaming agent, it is possible to prevent bubbles generated in the resin composition from impeding permeation of the resin composition. This may allow the resin composition to further penetrate into the raw material paper. In addition, when bubbles are generated in the resin composition, the surface of the covering paper may become uneven due to cured bubbles. By the resin composition containing the antifoaming agent, the generation of bubbles may be prevented and deterioration of the writing characteristic with a pencil may be prevented.

By the resin composition containing the antibacterial agent, it is possible to add an antibacterial feature to the covering paper and/or the clear file. As a result, the covering paper and/or the clear file have/has the antibacterial feature, and a clear file that may give users safety and security can be provided.

By the resin composition containing the antifungal agent, it is possible to add an antifungal feature to the covering paper and/or the clear file. As a result, the covering paper and/or the clear file have/has the antifungal feature, which may increase durability.

By the resin composition containing the antiviral agent, an antiviral feature can be added to the covering paper and/or the clear file. As a result, the covering paper and/or the clear file have/has the antiviral feature, and a clear file that may give users safety and security can be provided.

By the resin composition containing the coloring agent exemplified by various kinds of pigments and dyes, it is possible to add various designs to the covering paper and/or the clear file. As a result, the covering paper and/or the clear file may have a design. The coloring agent may be either a dye or a pigment. Similarly to a prior-art, publicly known polypropylene clear file, the clear file made of paper described in the present embodiment can be colored in any color.

(Usability as Inkjet Ink)

It is preferable that the resin composition be usable as ink for an inkjet printer. This may allow the raw material paper to be impregnated with the resin composition using the inkjet printer. If the resin composition is usable as the ink for the inkjet printer, the resin composition preferably contains a pigment exemplified by a black pigment or the like. This may allow the resin composition containing the pigment to be impregnated into the raw material paper in any shape using the inkjet printer. Consequently, it is possible to arrange the pigment in any shape on the covering paper and/or the clear file, while maintaining the characteristics of the covering paper and/or the clear file. As a result, the covering paper and/or the clear file may have a design.

When the resin composition is usable as the ink for the inkjet printer, the pigment contained in the resin composition preferably contains carbon black that excels in oil absorption and has a suitable primary particle size. As a result, the resin composition may exhibit suitable coloring power.

When the resin composition is usable as the ink for the inkjet printer, preferably, the resin composition does not easily clog nozzles of the inkjet printer. This may allow the resin composition to be suitably utilized as the ink for the inkjet printer.

When the resin composition is usable as the ink for the inkjet printer, the resin composition preferably excels in adhesion to the raw material paper and the covering paper. This may allow the resin composition to be suitably utilized as the ink for the inkjet printer.

[Blending Process]

The impregnation process preferably includes a blending process of obtaining a resin composition by blending various kinds of raw materials of the resin composition described above. This makes it possible to obtain a resin composition from the various kinds of raw materials of the resin composition, as necessary. The blending process is not specifically limited as far as the blending process is a process of blending the various kinds of raw materials of the resin composition.

In a case where the resin composition contains a pigment, the blending process preferably includes a process of mixing an energy ray polymerizable resin (for example, an acrylic monomer and an acrylic oligomer, or the like) and a pigment (for example, carbon black) with a dissolver or the like, and then crushing the pigment contained in this mixture with a bead mill or the like. This may allow the pigment to be crushed so that it is suitably dispersed in the resin composition. The process preferably includes a process of inspecting that the pigment has been crushed and suitably dispersed in the resin composition. As such, the resin composition in which the pigment is suitably dispersed may be obtained more reliably.

The blending process preferably includes a process of mixing and dissolving the various kinds of raw materials of the resin composition (the energy ray polymerizable resin such as the acrylic monomer, the photopolymerization initiator, and other materials, or the like) with a mixer or the like. As such, the resin composition in which the various raw materials of the resin composition are evenly mixed may be obtained.

When the resin composition contains a pigment, the process of blending the various kinds of raw materials preferably includes a process of mixing the energy ray polymerizable resin-pigment mixture obtained in the process of crushing pigments, the photopolymerization initiator, and the other materials. As a result, the various kinds of raw materials may be mixed, including the pigment that has been crushed and ready to be mixed. Therefore, the resin composition in which the various kinds of raw materials of the resin composition are evenly mixed may be obtained.

[Filling Process]

The impregnation process preferably includes a filling process of filling a container with the resin composition blended in the blending process. This may facilitate transportation and storage of the resin composition. In the filling process, it is preferable that the container be filled with the resin composition after properties thereof are inspected. As a result, the resin composition having desired properties may be obtained, filled, transported, and stored more reliably.

[Irradiation Process]

An irradiation process is a process of irradiating the impregnated resin composition with energy rays to cure the resin composition. This allows the (semi-)transparent covering paper with the sufficient durability to be obtained.

Means of irradiating the impregnated resin composition with energy rays is not specifically limited. The means of irradiating the impregnated resin composition with energy rays includes prior-art means capable of emitting ultraviolet rays, exemplified by an ultraviolet lamp, an ultraviolet fluorescent light, an ultraviolet LED, and an ultraviolet laser irradiation apparatus, for example. In addition, the means of irradiating the impregnated resin composition with energy rays includes prior-art means capable of emitting visible rays, exemplified by an incandescent lamp, a fluorescent lamp, an LED, a visible light laser irradiation apparatus, or the like, for example.

Although it is not an essential aspect, it is preferable that the means for performing the irradiation process be means that uses the covering apparatus 1 to be described below. A detailed description is given of the covering apparatus 1 below with reference to FIG. 1.

(Energy Rays)

Energy rays are not specifically limited, and may be, for example, electromagnetic waves and/or electron beams, or the like. When the energy rays contain electromagnetic waves, the electromagnetic waves are not specifically limited, and may be, for example, electromagnetic waves including one or more of ultraviolet rays, visible rays, infrared rays, or high-energy rays (for example, X rays). When the energy rays contain electromagnetic waves, the energy rays preferably include ultraviolet rays. Since the energy rays contain ultraviolet rays, the irradiation process may be performed by relatively easy means that uses various types of prior-art ultraviolet irradiation means.

When the energy rays contain electromagnetic waves, the electromagnetic waves contained in the energy rays preferably include a plurality of wavelength components. As such, when the resin composition contains two or more photopolymerization initiators and each of the two or more photopolymerization initiators has at least one absorption wavelength peak at mutually different wavelengths, the speed of curing in the interior and the speed of curing in the vicinity of the surface may be balanced by controlling a balance between the curing speed of the resin compositions near the surface and the curing speed of the internal resin composition.

This may prevent the covering paper and/or the clear file made of paper from deforming due to a difference in the curing speed. Moreover, coloring of the paper during the energy ray polymerization may be prevented, thus making the paper even more transparent, and further enhancing the function of the clear file that makes it possible to perceive the stored item.

In addition, since the balance between the curing speed of the resin composition in the vicinity of the surface and the curing speed of the resin composition in the interior may be controlled, it may also be expected that increasing molecular weight of polymers polymerized by the energy ray will eliminate sticky feeling when touched.

When the energy rays contain electromagnetic waves, wavelength components of the electromagnetic waves contained in the energy rays preferably include absorption wavelength peaks of the respective components contained in the photopolymerization initiator. As such, the energy ray polymerization is performed more suitably.

[Covering Apparatus 1]

FIG. 1 is a schematic diagram schematically describing the impregnation process and the irradiation process of the present embodiment. Although it is not an essential aspect, it is preferable that the impregnation process and the irradiation process of the present embodiment be performed by using the covering apparatus 1 that includes a paper delivery unit 2, an impregnation tank 4, and an energy ray irradiation unit 6.

(Paper Delivery Unit 2)

The paper delivery unit 2 is a member configured to deliver the raw material paper. The paper delivery unit 2 is not specifically limited, and may be, for example, a prior-art feeding unit capable of delivering roll paper.

(Guiding Unit 3)

Although it is not an essential aspect, the covering apparatus 1 preferably has guiding units 3 (reference numerals 3a to 3d in FIG. 1) for guiding raw material paper R to the impregnation tank 4 or the like. This may prevent the raw material paper R from hitting an edge of the impregnation tank 4 or the like and bending. The guiding unit 3 is not specifically limited, and may be a roller or the like capable of changing orientation of the paper, for example.

(Impregnation Tank 4)

The impregnation tank 4 is a tank for pooling the resin composition in a liquid form. As far as the impregnation tank 4 can pool a resin composition L in a liquid form, the impregnation tank 4 is not specifically limited, and may be a prior-art tank exemplified by a tank, a pool, a container, or the like. Since the covering apparatus 1 includes the impregnation tank 4, the raw material paper R delivered from the paper delivery unit 2 may be impregnated with the resin composition L within the impregnation tank 4.

(Sandwiching Unit 5)

Although it is not an essential aspect, the covering apparatus 1 preferably has sandwiching units 5 (reference numerals 5a to 5b in FIG. 1) for sandwiching the raw material paper R impregnated with the resin composition L in the impregnation tank 4. This may allow the resin composition L to further penetrate to the inside of the raw material paper R. In addition, any excess resin composition L adhering to the surface of the raw material paper R may be removed. The sandwiching unit 5 is not specifically limited, and may be, for example, a pair of rollers arranged at intervals substantially same as a thickness of the paper.

(Energy Ray Irradiation Unit 6)

The energy ray irradiation unit 6 irradiates the raw material paper R, which is impregnated with the resin composition L in the impregnation tank 4, with energy rays. As a result, the impregnated resin composition becomes a polymer by the energy ray polymerization and is cured. Then, the (semi-)transparent covering paper P with the sufficient durability can be obtained.

The energy ray irradiation unit 6 is not specifically limited, and may be, for example, an irradiation unit including the prior-art means capable of emitting ultraviolet rays, exemplified by the ultraviolet lamp, the ultraviolet fluorescent light, the ultraviolet LED, and the ultraviolet laser irradiation apparatus, or the like, for example.

In addition, the energy ray irradiation unit 6 may also be the irradiation unit including the prior-art means capable of emitting visible rays, exemplified by the incandescent lamp, the fluorescent lamp, the LED, the visible light laser irradiation apparatus, or the like, for example. The energy ray irradiation unit 6 may also be the irradiation unit including prior-art means capable of emitting electron beams, exemplified by an electron beam gun or the like, for example.

(Paper Winding Unit 7)

Although it is not an essential aspect, the covering apparatus 1 preferably has a paper winding unit 7 for winding the covering paper P. This allows for an aspect of winding up the covering paper P with sufficient durability to form the roll paper suitable for transportation and/or storage, or the like.

In the above, while a description has been given of the covering apparatus 1 that performs the impregnation process and the irradiation process, other apparatuses may be used to perform the impregnation process and/or the irradiation process. Examples of apparatuses for performing the impregnation process include a prior-art apparatus capable of applying a resin composition to paper, exemplified by a bar coater and the inkjet printer, or the like. Examples of apparatuses for performing the irradiation process include a prior-art apparatus capable of irradiating the paper with energy rays, exemplified by an ultraviolet irradiation apparatus or the like.

[Covering Paper P]

The (semi-)transparent covering paper P can be obtained from the impregnation process and the irradiation process described above.

The lower limit of a ratio of the raw material paper R to 100 pts. mass of the covering paper P is preferably 50 pts. mass or more. This can increase usage of paper, which is a biomass material, and contribute even more to SDGs.

The upper limit of a ratio of cured products of the resin composition L to 100 pts. mass of the covering paper P is preferably 50 pts. mass or less, more preferably 40 pts. mass or less, and even more preferably 35 pts. mass or less. This can further reduce the amount of the resin compositions used and contribute even more to SDGs.

The lower limit of the ratio of the cured products of the resin composition L to 100 pts. mass of the covering paper P is preferably 25 pts. mass or more, and more preferably 30 pts. mass or more. This may allow a sufficient amount of the resin composition L to penetrate, which thus may make the clear file even more transparent.

Since the covering paper P is uncoated paper covered with a cured product, characters or the like printed in the relatively thin colors such as the grade 4 or the grade 5 of the light colors of the color fastness using the grayscale for staining specified by JIS L 0801 may be determined through the covering paper P.

The refractive index of the cured product of the resin component covering the covering paper P is close to the refractive index of cellulose than to the refractive index of water. This contributes to the improved transparency of the paper. In addition, since the excess resin composition can be easily removed and the resin composition can be reused, the secondary effect of further contributing to achievement of SDGs is expected.

Since the glass transition temperature Tg of the cured products of the energy ray polymerizable (meth)acrylic monomer and/or oligomer contained in the resin composition that covers the covering paper P is 50° C. or higher, the cured products may be prevented from undergoing the glass transition and becoming soft in the normal temperature environment. Therefore, the covering paper P is durable.

In addition, since the energy ray polymerizable resin composition containing the (meth)acrylic monomer and/or oligomer cover/covers, as the cured product, the at least one surface of the uncoated paper, it is possible to prevent all of decreased transparency due to the evaporation of the liquid, and deterioration of the adhesiveness and the writability due to wetness of the paper surface.

(Abrasion Resistance)

The lower limit of an average value of abrasion resistance of the covering paper P measured according to the provisions of JIS P 8136 is preferably 100 times or more, more preferably 120 times or more, and even more preferably 130 times or more.

The clear file may be used in the setting where stored items are repeatedly taken in and out. Therefore, the (semi-)transparent clear file made of paper may be required to have the abrasion resistance so that the surface is less likely to be damaged when the stored items are repeatedly taken in and out.

The cured product P has the glass transition temperature Tg of 50° C. or higher and is cured as the resin composition whose bending strength is 60 MPa or more penetrates to the inside, or the like. Thus, the covering paper P can achieve the abrasion resistance described above, whereby the surface is less likely to be damaged when the stored items are repeatedly taken in and out. Therefore, durability that may withstand bending force may be achieved.

(Arithmetic Mean Roughness Ra)

The lower limit of arithmetic mean roughness of the covering paper P measured according to the provisions of JIS B 0733 is preferably 0.3 µm or more, more preferably 0.4 µm or more, and even more preferably 0.5 µm or more.

In addition, the upper limit of the arithmetic mean roughness of the covering paper P measured according to the provisions of JIS B 0733 is preferably 1.2 µm or less, more preferably 0.9 µm or less, and even more preferably 0.7 µm or less.

The clear file provides a function that allows at least a part of the stored item to be perceived from outside of a storing device. If it is easy to write the characters or the like describing the stored item on the surface of the clear file, the function of the clear file that makes it possible to perceive the stored item may be further enhanced. Additionally, if it is easy to put an adhesive sticky note describing a stored item on the surface of the clear file, the function of the clear file that makes it possible to perceive the stored item may be further enhanced.

Since at least one surface of the covering paper P is covered with the cured product of the resin composition L, the energy ray polymerizable (meth)acrylic monomer and/or oligomer penetrates to the inside and is cured. Thus, it is possible to set the lower limit and/or the upper limit of the arithmetic mean roughness Ra of the at least one surface of the covering paper P to the above-mentioned range that is suitable for writing and/or adhesion of the adhesive sticky note. This may further enhance the writing characteristic with a pencil and the adhesion characteristic.

[Assembly Process]

The assembly process is a process of assembling the (semi-)transparent clear file made of paper (which is hereinafter also simply referred to as the "clear file") using the covering paper P obtained with the above-described method according to the present embodiment. The assembly process is not specifically limited as far as the assembly process is a process of assembling the (semi-)transparent clear file made of paper using the covering paper P, and may be same as the prior-art clear file assembling method of assembling a clear file using plastics.

The assembly process may be a process including, for example, a processing process of processing the covering paper P into a predetermined shape which becomes a shape of the clear file by folding; a folding process of folding the processed covering paper obtained from the processing process; and a bonding process of bonding one end of the folded covering paper obtained from the folding process.

Although the processing process is not specifically limited, the processing process preferably includes a process of processing the covering paper P into the predetermined shape using a cutting machine or the like. This may increase work efficiency of the processing process and improve the precision of processing into the processed covering paper.

Although the folding process is not specifically limited, the folding process preferably includes a process of folding the processed covering paper using a folding machine. This may increase the work efficiency of the folding process.

Although the bonding process is not specifically limited, the bonding process preferably includes a process of bonding the one end of the folded covering paper using a crimping machine. This may increase the work efficiency of the bonding process.

The assembly process can provide the (semi-)transparent clear file made of paper having the sufficient durability.

[Clear File]

Since the glass transition temperature Tg of the cured product of the energy ray polymerizable (meth)acrylic monomer and/or oligomer contained in the resin composition L is 50° C. or higher, the (semi-)transparent clear file made of paper obtained with the method of the present embodiment may prevent the cured product from undergoing the glass transition and thus becoming soft in the normal temperature environment where the clear file is usually used. Therefore, the durable (semi-)transparent clear file made of paper may be provided.

The (semi-)transparent clear file made of paper obtained with the method of the present embodiment has the abrasion resistance and the arithmetic mean roughness Ra similar to those of the covering paper P used for assembly. Therefore, the (semi-)transparent clear file made of paper having the durability, the writing characteristic with a pencil, and the adhesion characteristic may be provided.

(Total Light Transmittance)

For the (semi-)transparent clear file made of paper that is obtained with the method of the present embodiment, the lower limit of total light transmittance in a thickness direction, which is measured according to the provisions of JIS K 7361-1, is preferably 10% or higher, more preferably 20% or higher, and even more preferably 30% or more.

Since the (semi-)transparent clear file made of paper that is obtained with the method of the present embodiment is covered on at least one surface with the cured product of the resin composition L of the present embodiment, the resin composition penetrates to the inside and is cured. Thus, the total light transmittance in the thickness direction can satisfy the lower limit mentioned above. As a result, the clear file becomes even more transparent and the function of the clear file that makes it possible to perceive the stored item may be further enhanced.

(Haze)

For the (semi-)transparent clear file made of paper that is obtained with the method of the present embodiment, the upper limit of haze in the thickness direction which is measured according to the provisions of JIS K 7136, is preferably 30% or lower, more preferably 25% or lower, and even more preferably 20% or lower.

Since the (semi-)transparent clear file made of paper that is obtained with the method of the present embodiment is covered on the at least one surface with the cured product of the resin composition L of the present embodiment, the resin composition penetrates to the inside and is cured. Thus, it is possible to achieve low haze in the thickness direction. As a result, the clear file becomes even more unclouded and transparent and the function of the clear file that makes it possible to perceive the stored item may be further enhanced.

(Clark Stiffness)

For the (semi-)transparent clear file made of paper that is obtained with the method of the present embodiment, is provided a clear file with Clark stiffness both in a longitudinal direction and in a short direction, which is measured according to the provisions of JIS P 8143, being 50 cm$^3$/100 or more.

The clear file may be placed in the setting where the force is applied to bend the clear file, the setting being exemplified by the edge of the bookend which is lower than the clear file, inside of the bag, or the like. Therefore, the (semi-)transparent clear file made of paper is required to have stiffness (rigidity) capable of withstanding the bending force.

The (semi-)transparent clear file made of paper that is obtained with the method of the present embodiment is covered on the at least one surface with the cured product of the resin composition L of the present embodiment. Thus, since the glass transition temperature Tg of the cured product is 50° C. or higher, and the resin composition L with excellent bending strength penetrates to the inside and is cured, or the like, it is possible to achieve that the Clark stiffness is 50 $cm^3/100$ or higher, which can withstand the bending force, in both the longitudinal direction and in the short direction. Therefore, the durability with respect to the bending force can be achieved.

A proportion of the resin composition in the (semi-)transparent clear file made of paper that is obtained with the method of the present embodiment is low. Moreover, the (semi-)transparent clear file made of paper that is obtained with the method of the present embodiment may be manufactured at a relatively low cost because it is made by assembling the coating paper that is obtained by impregnating the prior-art raw material paper with the resin composition having excellent cost effectiveness and curing the impregnated paper. Therefore, the (semi-)transparent clear file made of paper having the low proportion of the resin composition, which is obtained with the method of the present embodiment, can be more widely used in the market and contribute even more to SDGs.

EXAMPLES

In the following, the present invention is specifically described with reference to examples, but the present invention is not to be limited thereto.
<Sample Preparation>

TABLE 1

| | |
|---|---|
| Example 1 | Raw material paper: Single-glazed bleached kraft paper |
| Example 2 | Raw material paper: Pure white roll paper |
| Example 3 | Raw material paper: First high-quality paper |
| Example 4 | Raw material paper: Second high-quality paper |
| Comparative Example 1 | Raw material paper: Coated paper |
| Comparative Example 2 | Commercially available paper clear file made of paper |
| Control Example | Commercially available clear file made of polypropylene |

[Example 1] Clear File Made of Paper, the Raw Material Paper of which is the Single-Glazed Bleached Kraft Paper The following were prepared: the resin composition including 89.9 pts. mass of acryloylmorpholine as the energy ray polymerizable resin; 4.0 pts. mass of 2,4,6-trimethylbenzoyl-diphenylphosphine oxide, 3.0 pts. mass of 4-methylbenzophenone, and 3.0 pts. mass of 1-hydroxycyclohexyl-phenylketone as the photopolymerization initiator; and 0.1 pts. mass of methyl hydroquinone as a polymerization inhibitor.

Acryloylmorpholine is an energy ray polymerizable (meth)acrylic monomer having the viscosity at 25° C. of 12 mPa·s and the glass transition temperature Tg of the cured product of 145° C.

Subsequently, the above resin composition was applied to single-glazed bleached kraft paper having a length of 78.8 cm, a width of 109.1 cm, a basis weight of 80 $g/m^2$ and a thickness of 100 μm using a bar coater, and the kraft paper was impregnated with the resin composition. Then, the irradiation process of irradiating the impregnated paper with ultraviolet rays was performed, and a (semi-)transparent covering single-glazed bleached kraft paper (covering paper 1) was obtained.

The covering paper 1 weighed 68.8 g and the covering paper 1 weighed 103.2 g. The covering paper had the thickness of 100 μm.

Then, the above-mentioned covering paper 1 was divided into four parts and processed into a shape in which a commercially available clear file was unfolded. The processed covering paper 1 was folded and one end thereof was bonded to obtain the (semi-)transparent clear file according to Example 1. The clear file according to Example 1 was 31 cm long, 22 cm wide, and 20 μm thick, and weighed 17.4 g.

[Example 2] Clear File Made of Paper, the Raw Material Paper of which is the Pure White Roll Paper A (semi-)transparent clear file according to Example 2 was obtained with the same approach as in Example 1, except that the raw material paper was the pure white roll paper. The pure white roll paper has a length of 78.8 cm, a width of 109.1 cm, a basis weight of 65 $g/m^2$ and a thickness of 80 μm.

[Example 3] Clear File Made of Paper, the Raw Material Paper of which is the First High-Quality Paper A (semi-)transparent clear file according to Example 3 was obtained with the same approach as in Example 1, except that the raw material paper was the first high-quality paper. The first high-quality paper has a basis weight of 65 $g/m^2$ and a thickness of 80 μm.

[Example 4] Clear File Made of Paper, the Raw Material Paper of which is the Second High-Quality Paper A (semi-)transparent clear file according to Example 4 was obtained with the same approach as in Example 1, except that the raw material paper was the second high-quality paper. The second high-quality paper has a basis weight of 105 $g/m^2$ and a thickness of 130 μm.

[Comparative Example 1] Paper Clear File, the Raw Material Paper of which is the Coated Paper A (semi-)transparent clear file according to Comparative Example 1 was obtained with the same approach as in Example 1, except that the raw material paper was the coated paper (product name "Pearl Coat FSC" manufactured by MITSUBISHI PAPER MILLS LIMITED). The coated paper has a basis weight of 84.6 $g/m^2$ and a thickness of 65 μm.

[Comparative Example 2] Commercially Available Paper Clear File Made of Paper

As a comparative example, a commercially available paper clear file that was transparent on one side was used.
[Control Example] Commercially Available Clear File Made of Polypropylene As a comparative example, a clear file made of commercially available polypropylene was used.

<Evaluation>

[Ratio of Resin Component to Paper]

Based on a weight difference between the raw material paper and the covering paper 1, it is believed that the covering paper 1 contains 34.4 g of the resin composition. Since the coating paper 1 weighs 103.2 g, it is believed that the covering paper 1 contains 67 pts. mass of the paper and 33 pts. mass of the resin composition to 100 pts. mass of the covering paper 1. In addition, similarly to the covering papers obtained in the sample preparation phase in Examples 2 to 4, it is believed that the mass ratio of the uncoated paper to the resin composition is in the range of the uncoated paper: the resin composition=60-70: 40-30.

Based on the ratio of the paper to the resin composition contained in the covering paper 1 described above, it is believed that Example 1 contained 11.6 g of the paper and 5.8 g of the resin composition. Similarly, it is believed that Examples 2 to 4 contained the paper and the resin composition in the range of the mass ratio mentioned above.

[Function Evaluation]

Each of Examples, Comparative Examples, and Control Example was evaluated for transparency, strength, and writing/printing suitability.

[Transparency Evaluation]

Examples, Comparative Examples, and Control Example were each placed on the grayscale for staining according to the provisions of JIS L 0801, and ranked in descending order of a degree whereby a difference in grayscale colors for staining can be distinguished (descending order of transparency). The results were, in descending order of color fastness, the Control Example (capable of distinguishing the relatively light colors of the grade 5 of the color fastness for staining), Example 1, Example 2, Example 3, Example 4, Comparative Example 1, and Comparative Example 2 (capable of distinguishing the relatively dark colors of the grade 3 of the color fastness for staining). The Control Example could distinguish up to the relatively light colors of the grade 5 of the color fastness for staining. Examples 1 to 4 could distinguish up to the relatively light colors of approximately the grade 4 or the grade 5 of the color fastness for staining. Comparative Example 1 and Comparative Example 2 could distinguish up to the relatively dark colors of the grade 3 of the color fastness for staining.

[Strength Evaluation]

In addition, ease of bending was evaluated by holding each of Examples, Comparative Examples, and Control Example by hands. Table 2 shows the results.

TABLE 2

| Example 1 | Difficult to bend |
| Example 2 | Difficult to bend |
| Example 3 | Slightly easy to bend |
| Example 4 | Difficult to bend |
| Comparative Example 1 | Difficult to bend |
| Comparative Example 2 | Easy to bend |
| Control Example | Difficult to bend |

[Writability/Printability Evaluation]

For each of Examples, Comparative Examples, and Control Example, writing with a pencil and printing on a surface were performed to evaluate whether or not each of them had the writability with a pencil and whether or not each of them had the printability. Table 3 below shows results.

TABLE 3

|  | Writability | Printability |
| --- | --- | --- |
| Example 1 | Yes | Yes |
| Example 2 | Yes | Yes |
| Example 3 | Yes | Yes |
| Example 4 | Yes | Yes |
| Comparative Example 1 | Yes | Yes |
| Comparative Example 2 | Yes | Yes |
| Control Example | No | Yes |

[Evaluation of Suitability for Gluing]

Each of Examples 1 to 4 was evaluated for whether or not the clear file was suitable for taping or gluing. All of Examples 1 to 4 was suitable for taping and gluing.

[Adhesion Evaluation]

Each of Examples 1 to 4 was evaluated for whether or not adhesion was done properly. All of Examples 1 to 4 were adhered properly.

[Stickiness Evaluation]

Each of Examples 1 to 4 was evaluated for whether or not the clear file was sticky. None of Examples 1 to 4 were sticky.

[Evaluation of Warpage and Deformation]

Each of Examples 1 to 4 was evaluated for whether or not the clear file warped and deformed during curing. None of Examples 1 to 4 warped and deformed.

[Burr Evaluation]

Each of Examples 1 to 4 was evaluated for whether or not any unnecessary protrusions (burrs) were formed at a cut part when a commercially available clear file was processed into the unfolded shape. None of Examples 1 to 4 had any burrs.

[Back Split Evaluation]

Each of Examples 1 to 4 was evaluated for whether or not there was a back split, which is a split of a folded part during folding. There was no back split in Examples 1 to 4.

DISCUSSION

The covering paper 1 of the present embodiment contains 67 pts. mass of the paper and 33 pts. mass of the resin composition with respect to 100 pts. mass of the covering paper 1. Thus, usage of the paper, which is the biomass material, may be increased and usage of the resin compositions may be further reduced. Consequently, the covering paper 1 and the manufacturing method thereof of the present embodiment can contribute even more to SDGs.

While Example 1 contains 5.8 g of plastics (resin compositions), Control Example contains 24.7 g of plastics. Therefore, replacement of one sheet of clear file of Control Example to be produced with the clear file of Example 1 can reduce the amount of plastics produced by 18.9 g.

If ten million sheets of the produced clear files of Control Example were replaced with the clear files of Example 1, the amount of plastic production could be reduced by 189 tons. Assuming that production of 1 ton of plastics emits 2.07 tons of $CO_2$, this corresponds to a reduction of 392 tons of $CO_2$ emissions. Therefore, Example 1 can reduce $CO_2$ emissions and contribute to SDGs.

In addition, while the weight of Control Example (clear file made of commercially available polypropylene) was 24.7 g, that of Example 1 was 17.4 g which was approximately 30% lighter than Control Example. It is believed that suppression of the usage of the resin compositions resulted in the lighter weight than the prior-art polypropylene-made clear file.

Based on the transparency evaluation, even in a case where Examples 1 to 4 store stored items on which contents were printed in relatively light colors such as the grade 4 or the grade 5 of the color fastness using the grayscale for staining specified in JIS L0801, it is believed that users can determine the contents printed on the stored items. It is believed that due to blending of the energy ray polymerizable resin and the photopolymerization initiator in the resin composition, or the like, the resin composition having the refractive index close to that of cellulose penetrated to the inside and was cured, so that sufficient transparency was obtained.

Based on the strength evaluation, it is believed that Examples 1 to 4 have the durability capable of withstanding the bending and the stored items being taken in and out. It is believed that due to the blending of the energy ray polymerizable resin and the photopolymerization initiator in the resin composition, or the like, the resin composition with a high glass transition temperature of Tg penetrated to the inside and was cured, so that the sufficient durability was obtained.

Based on the writability/printability evaluation, it is believed that the characters describing the stored items or the like can be written with a pencil on the surfaces of Examples 1 to 4. It is believed that since Examples 1 to 4 are papers covered by the cured resin compositions, they are suitable for writing with a pencil, unlike Control Example.

Based on the evaluation of suitability for gluing, it was found that Examples 1 to 4 were suitable for gluing and that adhering could be performed suitably. It is believed that due to the blending of the energy ray polymerizable resin and the photopolymerization initiator in the resin composition, or the like, the resin composition was sufficiently cured and a state suitable for gluing and adhesion was achieved.

Based on the stickiness evaluation, the warpage and deformation evaluation, the burr evaluation, and the back split evaluation, it was confirmed that there was no significant difference in the curing speed of the resin compositions between the inside and the outside, and that the resin composition was sufficiently cured to the inside. It is believed that due to the blending of the energy ray polymerizable resin and the photopolymerization initiator in the resin composition, or the like, the resin compositions penetrated to the inside and was sufficiently cured.

Consequently, it was confirmed that the method of the present embodiment could provide the (semi-)transparent clear file made of paper with excellent functionality.

Example 1 has favorable properties such as a high proportion of the resin compositions, excellent transparency, and adequate strength. Therefore, it is believed that Example 1 is the (semi-)transparent clear file made of paper superior to Examples 2 to 4 in that Example 1 can withstand long-term use and has extremely excellent transparency.

Example 2 has favorable properties such as the transparency next to that of Example 1 and the strength equivalent to that of Example 1. Therefore, it is believed that Example 2 is the (semi-)transparent clear file made of paper superior to Examples 3 to 4 in that Example 2 can withstand the long-term use and has the excellent transparency.

Although Example 4 has the least transparency of Examples 1 to 4, Example 4 has sufficient transparency to be able to distinguish the relatively light colors of approximately the grade 4 or the grade 5 of the color fastness and the strength equivalent to Example 1. Therefore, it is believed that Example 4 is the (semi-)transparent clear file made of paper superior to Example 3 in that Example 4 can withstand the long-term use and has the sufficient transparency.

Therefore, the (semi-)transparent clear file made of paper and the manufacturing method thereof of the present embodiment can contribute to SDGs.

Although a description has been given of the embodiment of the present invention, the present invention is not limited to the above-described embodiment. In addition, the effects described in the above-described embodiment are merely a recitation of the most preferable effects produced by the present invention, and the effects of the present invention are not limited to those described in the above-described embodiment. Moreover, the above-described embodiment has been described in detail in order to explain the present invention in an easy-to-understand manner, and is not necessarily limited to those having all the configurations described.

DESCRIPTION OF THE REFERENCE NUMERALS

1 Covering apparatus
2 Paper delivery unit
3 Guiding unit
4 Impregnation tank
5 Sandwiching unit
6 Energy ray irradiation unit
7 Paper winding unit
L Resin composition
P Covering paper
R Raw material paper
UVa Ultraviolet rays
UVb Ultraviolet rays

The invention claimed is:

1. A semi-transparent clear file comprising a (semi-)transparent covering paper in which at least one surface of uncoated paper is covered with a cured product of a resin composition, wherein
the resin composition contains an energy ray polymerizable (meth)acrylic monomer and/or oligomer having a viscosity at 25° C. of 100 mPa·s or less, and glass transition temperature Tg of the cured product of 50° C. or higher,
the uncoated paper has a basis weight of 65 g/m$^2$ or more and 100 g/cm$^2$ or less;
the uncoated paper has a thickness of 80 μm or more and 100 μm or less, and
a proportion of the uncoated paper with respect to 100 pts. mass of the covering paper is 50 pts. mass or more and a proportion of the cured product is less than 50 pts. mass.

2. The semi-transparent clear file according to claim 1, wherein the monomer and/or the oligomer are/is alkali-soluble.

3. The semi-transparent clear file according to claim 1, wherein the resin composition contains:
70 pts. mass or more and 90 pts. mass or less of a (meth)acrylic acid ester monomer with respect to 100 pts. mass of the resin composition, and
20 pts. mass or less of a (meth)acrylic acid ester oligomer and/or an inert resin with respect to 100 pts. mass of the resin composition.

4. The semi-transparent clear file according to claim 1, wherein the resin composition further contains an acylphosphine, alkylbenzophenone, and a hydroxyalkylphenone.

* * * * *